Aug. 13, 1968   P. BRAUER   3,397,028
HIGH-TEMPERATURE FUEL ELEMENT APPARATUS
Filed Aug. 3, 1967   2 Sheets-Sheet 1

Inventor:
PHILIPP BRAUER

ATTORNEY

Aug. 13, 1968    P. BRAUER    3,397,028
HIGH-TEMPERATURE FUEL ELEMENT APPARATUS
Filed Aug. 3, 1967    2 Sheets-Sheet 2

Inventor:
PHILIPP BRAUER
By
ATTORNEY 3,397,028
HIGH-TEMPERATURE FUEL ELEMENT
APPARATUS
Philipp Brauer, Mannheim-Seckenheim, Germany, assignor to Brown, Boveri & Cie A.G., Mannheim-Kafertal, Germany, a corporation of Germany
Filed Aug. 3, 1967, Ser. No. 658,157
Claims priority, application Germany, Aug. 11, 1966, B 88,435
10 Claims. (Cl. 431—115)

ABSTRACT OF THE DISCLOSURE

This invention relates to high-temperature fuel element apparatus from which hydrocarbons are directly converted into electrical energy. The fuel element 5 is arranged to be heated by means of burners 9 supplied with fuel from a pressure tank 1 through a fuel inlet line 3, 8. The fuel is preheated in line 3 as the latter passes through the heat exchanger 4 before entering the fuel element 5. To provide $H_2O$ and $CO_2$ from exhaust gas line 13 into fuel line 3, connecting pipes 14a or 14b are arranged at A within the heat exchanger 4 between the fuel being preheated in the supply line 3 and the exhaust lines 13 from which exhaust gases give up their heat in the heat exchangers. These connecting pipes 14a, 14b have an opening 15 located within the exhaust gas line 13 and directed with such opening facing upstream relative to the flow prevailing in the exhaust line 13 to capture and supply $H_2O$ and $CO_2$ from the exhaust gases to the fuel gas.

According to a further embodiment, the connecting pipes 14b are C-shaped and have lower portions 16 extending into the fuel supply line 3, said lower portions having openings arranged in the downstream flow direction of the hydrocarbon fuel to reduce the effect of static pressure in the fuel line. An increase is thus obtained in the amount of $H_2O$ and $CO_2$ drawn from the exhaust gas line 13 into the upper portion 15 of the C-shaped connecting tube and thus supplied to the fuel supply line 3. By utilizing the downstream pressure prevailing in the exhaust line 13, $H_2O$ or $CO_2$ is drawn into and supplied to the fuel supply line 3 via the connecting tube 14a or 14b. In one embodiment, the cross sections of the connecting pipes 14a, 14b are selected to correspond with the desired mixing ratio between the hydrocarbon fuel and the $H_2O$ and $CO_2$ additions. According to another embodiment, throttle flaps 17 are arranged in the connecting pipes 14b and these flaps are made adjustable, either by automatic means or manual manipulation.

---

This invention relates to high-temperature fuel element apparatus wherein hydrocarbons are burned and directly converted into electrical energy. Types of thermionic apparatus for conversion into electrical energy are known, and therefore are not described or illustrated herein, since they are not part of the invention.

When hydrocarbons are used as fuel in prior art high-temperature fuel elements, carbon is often precipitated in the fuel lines as the hydrocarbon fuel passes through the heat exchanger. This carbon precipitation occurs as a result of the thermal dissociation of the hydrocarbon fuel. Because of the precipitated carbon, the fuel lines become clogged after a brief period, and the fuel elements thus become eliminated from use in the energy conversion unit. At higher operating temperatures of the fuel elements, this problem of precipitation of amorphic carbon may be prevented through oxidation of the carbon.

In one known method used to effect such oxidation of the carbon into $CO_2$ in energy converters, the carbon dioxide formed is eliminated simultaneously prior to its entry into the fuel elements, so that only hydrogen remains as a fuel.

It is also known to inject $H_2O$ or $CO_2$ into the fuel to enrich the hydrocarbon fuel with carbon monoxide and hydrogen in accordance with the equation:

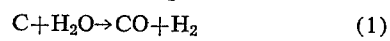

$$C + H_2O \rightarrow CO + H_2 \quad (1)$$

or

$$C + CO_2 \rightarrow 2CO \quad (2)$$

It is also known to enrich the fuel with water vapor to achieve the same effect as Equation 1 above by passing the fuel through a water container prior to its entering into the heat exchangers of the fuel elements.

However, among the disadvantages of these known devices is that they require additional vessels or containers for water, for the water vapor, or for the $CO_2$. During the oxidation of the carbon into $CO_2$ and for injecting $H_2O$ or $CO_2$ into the fuel, fuel pumps are also required. All of these additional parts and equipment considerably increase the volume and weight of the high-temperature fuel elements and of their overall assembly unit. This is of great disadvantage, particularly if the subject fuel element apparatus are intended for mobile rather than for stationary use. Furthermore, in order to oxidize the carbon and prevent precipitation thereof in the fuel lines, as above mentioned, the substances to be added to the hydrocarbon must be heated virtually to reaction temperature. To effect this, further additional devices and energy inputs are needed. In the heretofore known direct-conversion devices, therefore, only hydrogen remains as a fuel, in most cases, and this reduces the effectiveness of the fuel element apparatus.

To prevent the above-mentioned thermal dissociation of the hydrocarbon in the fuel pipes, which would result in the precipitation of carbon and clogging of the fuel lines, when used in connection with high-temperature fuel elements in which hydrocarbons are directly converted into electrical energy, one feature of the present invention provides for supplying the hydrocarbon with $H_2O$ and $CO_2$ from the exhaust gases. This is accomplished by introducing the $H_2O$ and $CO_2$ into the fuel line by arranging connecting pipes within the heat exchanger of the high-temperature fuel element apparatus, located between the exhaust lines and the fuel supply lines.

In order to best utilize the prevailing gas pressure which develops in the exhaust lines, to supply $H_2O$ and $CO_2$ from the exhaust lines into the fuel supply line, the invention further provides for sections of these connecting pipes to extend into the exhaust gas lines and to have openings directed upstream against the flow prevailing in the exhaust lines to receive $H_2O$ and $CO_2$ therefrom.

To increase the supplied volume of the $H_2O$ and the $CO_2$ additions to be added to the hydrocarbon fuel, a further embodiment of the invention provides for C-shaped connecting pipes having an upper leg with a portion extending upstream into the exhaust line, and a lower leg having a portion with an opening directed downstream into the fuel line, the latter opening being arranged in the flow direction of the hydrocarbon fuel.

In order to obtain a specific desired mixing ratio between the hydrocarbon fuel and the $H_2O$ and $CO_2$ additions, a further feature of the invention provides that the cross sections of the connecting pipes are selected according to the desired mixing ratio.

According to a further modification of the invention, throttle valves or flaps are arranged within the connecting pipes between the upper leg leading into the exhaust line and the lower leg leading into the fuel line. These throttle flaps are adjustable, either by manual or by automatic means, to change and control the mixing ratio between the hydrocarbons and the additions of $H_2O$ and $CO_2$.

Embodiments of this invention are shown in the accompanying drawings, as typical examples, and will be described in greater detail below. In the drawings.

Figure 1:
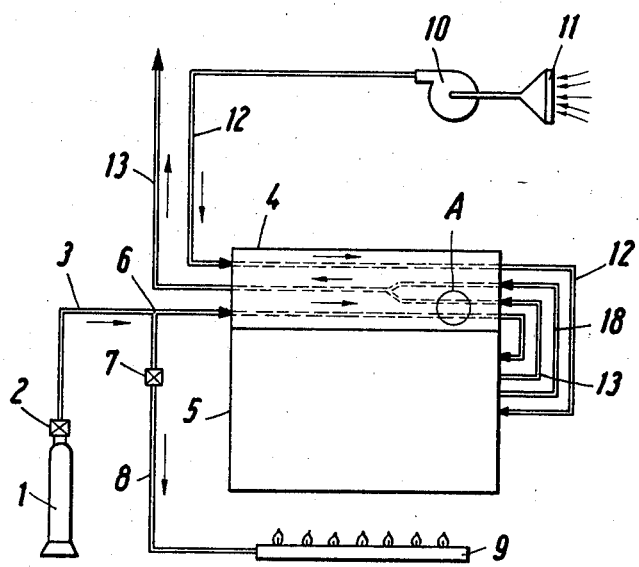
FIG. 1 is a schematic flow diagram illustrating, in elevation view, an installation of high-temperature fuel element apparatus according to the invention.
Figure 1:

The drawings illustrate an installation with high-temperature fuel element apparatus which comprises the fuel circulation system, the air-supply inlets and outlets, as well as the exhaust gas installation and water-vapor lines. The devices for direct conversion of the heat to electricity are not shown, since they are not part of this invention.

The fluid or gaseous fuel is supplied from a high pressure gas bottle or cylinder 1 through supply line 3 with an interposed pressure control or regulating valve 2. The hydrocarbon fuel then is passed through the fuel supply line 3, which leads through a heat exchanger 4 wherein the fuel is heated and passes in a heated state to the high-temperature fuel elements 5. A branch or T connection 6 is located in the fuel supply 3, before the latter enters into the heat exchanger 4. A branch fuel line 8 is connected to the fuel line 3 at the T connection 6 to receive a supply of fuel for conveying it to a burner 9. A shut-off valve 7 is provided in the branch line 8, between the T connection 6 and the burner 9. The burner 9 serves to preheat the high-temperature fuel elements 5 and the heat exchanger 4.

Air is supplied to the high-temperature fuel element 5 through an air supply line 12. The air enters through an air filter 11 into which the air is drawn by means of an intake blower 10, from which the air is forced by the blower through the air supply line 12 into the heat exchanger 4. In the heat exchanger 4, the incoming air is heated to a higher temperature and then passes further through the other portion of line 12 into the fuel elements 5.

Exhaust gases are removed from the high-temperature fuel elements 5 through an exhaust line 13. The hot exhaust gases pass in line 13 through the heat exchanger 4, flowing in a direction countercurrent to the flow of the fuel gases in line 3, and also countercurrent to the air flowing through line 12 as the lines 3 and 12 pass through heat exchanger 4.

Figure 2:
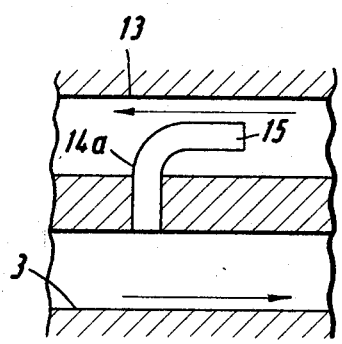
FIG. 2 is an enlarged illustration, in section, of the zone indicated in FIG. 1 by the circle A, showing a connecting pipe arranged in the heat exchanger between the exhaust line and the fuel line.

In the zone indicated by the circle A of FIG. 1 and shown enlarged in FIG. 2, a connecting pipe 14a is mounted within the heat exchanger 4, passing through an internal wall thereof so as to connect the exhaust line 13 with the fuel line 3. The opening 15 of the connecting pipe 14a is oriented toward the upstream direction of the flow of exhaust gases in exhaust line 13 so as to take advantage of the prevailing pressure of the exhaust gases containing $H_2O$ and $CO_2$, and to force the latter into and through connecting pipe 14a into the fuel line 3. By thus utilizing the pressure prevailing in the exhaust line 13, $H_2O$ and/or $CO_2$ is drawn into and supplied through the connecting pipe 14a to the fuel supply line 3.

Figure 3:
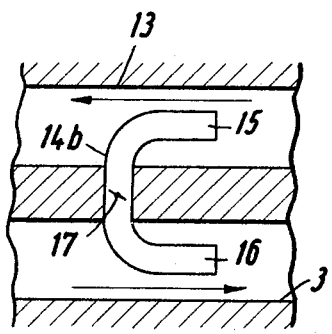
FIG. 3 is a section showing another embodiment of the invention, also taken at the zone A of FIG. 1 and illustrating a modification of the embodiment of FIG. 2.

According to the embodiment of the invention shown in FIG. 3, the zone A (FIG. 1) of the heat exchanger 4, is provided with a C-shaped connecting pipe 14b which extends from the exhaust line 13 to the fuel line 3 through the intermediate wall of the heat exchanger 4. As in the embodiment of FIG. 2, the upper leg of the connecting pipe extends with its opening 15 oriented in the upstream direction of the exhaust pipe 13. While in the embodiment of FIG. 2, the pipe 14a has an opening into the fuel line 3 and extends no further, in the embodiment of FIG. 3 the C-shaped connecting pipe 14b extends down into the fuel line 3 and terminates in an opening 16 extending downstream in the same direction as the flow of the hydrocarbon fuel in the fuel line. The lower leg terminating in the opening 16 serves to eliminate static pressure on the connecting pipe 14b caused by the fuel flowing in the line 3. This additional tube portion 16 thus causes an increase in the amount of $H_2O$ and $CO_2$ which is drawn into and thus supplied to the fuel supply line 3 from the exhaust line 13.

The relative diameters of the connecting pipe portions 15 and 16 may be selected in accordance with the desired ratio of additive $H_2O$ and $CO_2$ in proportion to the hydrocarbon fuel in line 3.

In accordance with a further modification of the invention, a throttle flap valve 17 (FIG. 3) is provided in the connecting pipe 17b between the openings 15 and 16 in order to control and regulate the amount of $H_2O$ and $CO_2$ drawn into the connecting pipe at 15 from the exhaust line 13 and passing out through opening 16 into the fuel line 3. Regulation of the throttle valve 17 may be by manual or by automatic means.

However, due to the effects of concentration polarization, the amount of exhaust gas supplied to the fuel with the $H_2O$ and the $CO_2$ must be very carefully measured and should not be substantially higher than absolutely necessary. Accordingly, the cross section of the pipe 14a of FIG. 2 is selected and adjusted to supply no more than is absolutely necessary of the exhaust gas itself, albeit with $H_2O$ and $CO_2$ additions.

Alternatively, in the modification of FIG. 3, a throttle flap 17, equipped with appropriate control members (not shown) to provide either manual or automatic control in accordance with known types of control devices, to adjust the flow of $H_2O$ and $CO_2$ from exhaust line 13 into fuel line 3, while still maintaining a control of the amount of exhaust gas, per se, passing through the connecting pipe 14a or 14b.

The removal of air from the fuel elements 5 is effected, as shown schematically in FIG. 1, through a pipe line 18, which also passes through the heat exchanger 4 in order to give up its latent heat. The pipe line 18 discharges into the exhaust line 13, within the heat exchanger subsequent to the zone A where the connecting pipes 14a or 14b are located. The exhaust air then is discharged through the exhaust line 13 and discharged from the apparatus.

Thus, the equipment according to the present invention in a simple manner prevents the formation of amorphic carbon in fuel supply lines, without requiring additional devices such as vessels, containers and pumps for $H_2O$ and $CO_2$ to be added, which vessels and pumps would increase the weight of the fuel elements and in addition would considerably raise the cost of such installations.

It will be obvious to those skilled in the art, upon studying this disclosure, that devices according to this invention can be modified in various respects and hence may be embodied in apparatus other than as particularly illustrated and described herein, without departing from the essential features of this invention and within the scope of the claims annexed hereto.

What is claimed is:

1. In high-temperature fuel element apparatus for directly converting hydrocarbons into electrical energy, a fuel element, heat exchanger means, fuel line means passing through said heat exchanger means for supplying preheated fluid fuel to the fuel element, air supply line means passing through said heat exchanger means for supplying preheated air to said fuel elements, exhaust duct means passing from said fuel element through said heat exchanger means, and a connecting pipe within said heat exchanger means joining said exhaust duct means with said fuel line means for introducing $H_2O$ and $CO_2$ from said exhaust duct means to said fuel line means.

2. Apparatus according to claim 1, said exhaust duct means being adapted to carry exhaust gases from said fuel element in a predetermined flow direction, said connecting pipe having a portion thereof extending within said exhaust duct means in an upstream direction in opposition to the direction of flow of exhaust gases within said exhaust duct means.

3. Apparatus according to claim 2, said connecting pipe portion being provided with an inlet opening facing in an upstream direction relative to said direction of flow of exhaust gases for receiving $H_2O$ and $CO_2$ from the exhaust gases in said exhaust duct means.

4. Apparatus according to claim 3, said fuel line means being adapted to carry fuel to said fuel element in a predetermined fuel flow direction, said connecting pipe having a further portion thereof extending into said fuel line means in a downstream direction relative to said predetermined fuel flow direction.

5. Apparatus according to claim 4, said further connecting pipe portion being provided with an outlet opening facing in a downstream direction relative to said fuel flow direction for discharging $H_2O$ and $CO_2$ additions into said fuel line means.

6. Apparatus according to claim 3, said connecting pipe portion having a cross sectional area adapted to provide a predetermined flow of additions of $H_2O$ and $CO_2$ therein in accordance with a selected mixing ratio of said additions relative to the fuel flow in said fuel line means.

7. Apparatus according to claim 4, said connecting pipe portion and said further portion thereof having respective cross sectional areas adapted to provide a predetermined flow of additions of $H_2O$ and $CO_2$ therein in accordance with a selected mixing ratio of said additions relative to the fuel flow in said fuel line means.

8. Apparatus according to claim 5, said connecting pipe being provided with throttle flap means for controlling the flow of said additions in said connecting pipe.

9. Apparatus according to claim 8, further including means for controlling said throttle flap means.

10. Apparatus according to claim 8, further including automatic control means for controlling said throttle flap means in accordance with a selected mixing ratio of said additions relative to the fuel flow in said fuel line means.

References Cited
UNITED STATES PATENTS

| | | | |
|---|---|---|---|
| 1,492,674 | 5/1924 | Chapman | 158—1 |
| 3,097,686 | 7/1963 | Morrow | 158—1 |
| 3,258,508 | 6/1966 | La Fleur | 158—1 |

FREDERICK L. MATTESON, JR., *Primary Examiner.*

E. G. FAVORS, *Assistant Examiner.*